United States Patent [19]

Matthews

[11] 3,859,472

[45] Jan. 7, 1975

[54] CODE MODULE FOR SUBSCRIBER TERMINALS

[75] Inventor: Solomon Bertram Matthews, Montreal, Quebec, Calif.

[73] Assignee: Automatic Electronic Systems, Montreal, Quebec, Canada

[22] Filed: Dec. 17, 1973

[21] Appl. No.: 425,066

[52] U.S. Cl. .......... 179/18 FH
[51] Int. Cl. .......... H04q 3/72
[58] Field of Search .......... 179/18 FH

[56] References Cited

UNITED STATES PATENTS

| | | | |
|---|---|---|---|
| 2,963,553 | 12/1960 | White | 179/18 FH |
| 3,745,258 | 7/1973 | Lawrence | 179/18 FH |

*Primary Examiner*—William C. Cooper
*Attorney, Agent, or Firm*—Alan Swabey; Robert E. Mitchell

[57] ABSTRACT

To monitor the number of outside calls made by each subscriber terminal of a PBX telephone system, each subscriber terminal must be uniquely identified. In accordance with present day practices, PBX systems which have monitoring facilities either perform the monitoring function on the terminal side of the PBX, in which case a large number of monitoring devices are required, or they supply a unique frequency at each subscriber terminal and monitor on the outside trunk line side of the PBX. The use of a separate monitoring function or a separate frequency generator at each subscriber terminal makes the system expensive. The instant invention overcomes these disadvantages by providing a single code module with a plurality of outputs equal at least to the number of subscriber terminals. With these means for identifying the terminals, detectors are required only on the trunk side of the PBX. A code word generator in the module generates a unique code word at each of the module outputs, and each output is applied to a different subscriber terminal. Preferably, the code word generator is a maximal length pseudo-random code generator whose output is serially connected to a long shift register. The outputs of the stages of the long shift register correspond to the outputs of the code word module, and these are connected, in parallel, to the subscriber terminals. A unique code word is generated at each output.

8 Claims, 7 Drawing Figures

Patented Jan. 7, 1975

3,859,472

4 Sheets-Sheet 3

CODE MODULE FOR SUBSCRIBER TERMINALS

BACKGROUND OF THE INVENTION

1. Field of the Invention

This invention relates to an apparatus for injecting a different unique code word on each telephone subscriber terminal of a private branch exchange telephone system. More specifically, the invention relates to such an apparatus comprising a single code generator for providing the required unique codes to a plurality of terminals.

2. Description of the Prior Art

Many large establishments, such as business organizations and government offices, contain telephone systems wherein a large number of subscriber terminals are serviced, via a private branch telephone exchange (PBX) by a smaller number of trunk lines. Usually, the subscriber terminals can dial the numbers outside of the office without going through the PBX operator (for example, by dialing 9 to seize an outside trunk line), and they can also make long distance calls in the same way.

It has become increasingly important to be able to monitor the number of calls made by each subscriber terminal, especially the long distance calls. In such monitoring, the information required is the identity of the subscriber terminal and the outside number being called. It is also useful to gather data concerning the number of outside calls which come into each subscriber terminal. Again, the identity of the called subscriber terminal must be established.

A large number of presently available PBX systems contain no means for performing such monitoring functions. In some systems, where monitoring means are provided, scanners or monitors are placed on the terminal side of the PBX system. Such systems require many more scanners or monitors than would be required if the scanning or monitoring were done on the trunk side of the PBX system.

SUMMARY OF THE INVENTION

Applicant is aware of a system which performs the monitoring on the trunk side of the PBX system. In the aforementioned system, each user terminal is identified by a unique frequency associated with the user terminal. Here, a separate frequency source is required at each terminal, which increases the cost of the system.

Such, and other disadvantages are overcome with the instant invention which provides a single code word module which provides a unique code word to each subscriber terminal. With the terminals so identified, detection is required only on the trunk side of the PBX.

In accordance with the invention, apparatus for injecting a unique code word on each of a plurality of telephone subscriber terminals of a private branch exchange telephone system with a smaller plurality of outside trunk lines, comprises: a code word module having a plurality of outputs; said plurality of outputs being at least equal to said plurality of telephone subscriber terminals; each one of said plurality of outputs being connected to a different one of said plurality of telephone subscriber terminals; and, means in said code word module for generating a different unique code at each one of said plurality of outputs.

Preferably, the means for generating the code words comprises a maximal length pseudo-random code generator.

The output of the pseudo-random code generator may be connected to a long shift register having a plurality of stages with an output means at each stage. The outputs of the stages are the outputs of the code word module. The means for generating the code words includes an output means and the long shift register includes an input means, and the last mentioned output means is connected to the last mentioned input means.

BRIEF DESCRIPTION OF THE DRAWINGS

The invention will be better understood by an examination of the following description together with the accompanying drawings in which.

DESCRIPTION OF THE PREFERRED EMBODIMENTS

Figure 1:
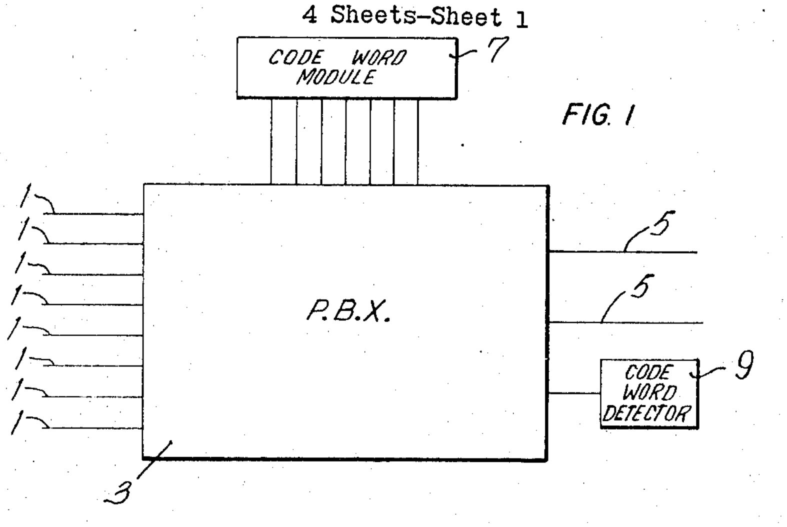
FIG. 1 is a general block diagram in accordance with the invention.

Referring now to FIG. 1, lines 1, from a plurality of subscriber terminals are fed to a private branch exchange (PBX) interconnection box 3 which contains means for connecting the lines 1, one at a time, to one of the outside trunk lines 5. Such systems are well known in the art and require no further discussion here.

In accordance with the invention, a code word module 7, which will be further described below, can provide a different unique code for each of the subscriber terminals, and a code word detector 9 detects the identifying codes on the trunk side of the PBX. The use of a single module to provide unique codes is less costly than the alternative of providing means on each terminal for identifying the terminal. Thus, the overhead of a system in accordance with the invention for monitoring terminals is minimized having regard to the monitoring function.

Figure 2:
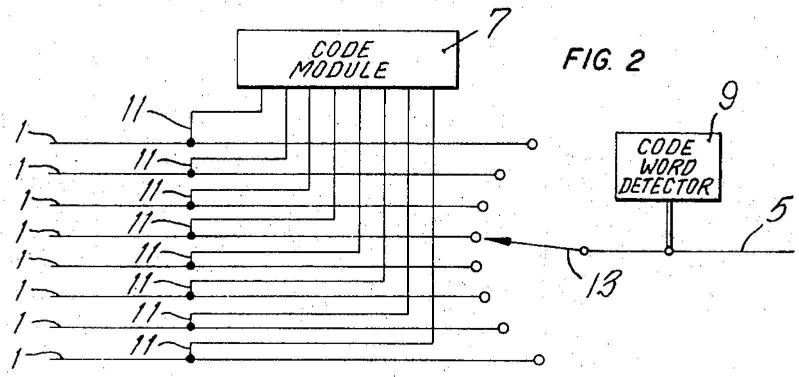
FIG. 2 is a schematic diagram illustrating the features of the invention.

Referring now to FIG. 2, each output of the code word module is connected, via a plurality of lines 11, to a different subscriber terminal line 1 to thereby inject the signals at the respective outputs of the code word module on the respective subscriber terminal. The means by which a subscriber terminal seizes a trunk line are well known in the art and are only schematically represented in the figure by a switch 13. The code detector 9 will detect the identifying code of a subscriber terminal when it seizes the trunk line. Although the code word detector is shown connected to the trunk line, it is, of course, possible to have a single code word detector scanning a plurality of trunk lines.

Figure 3:
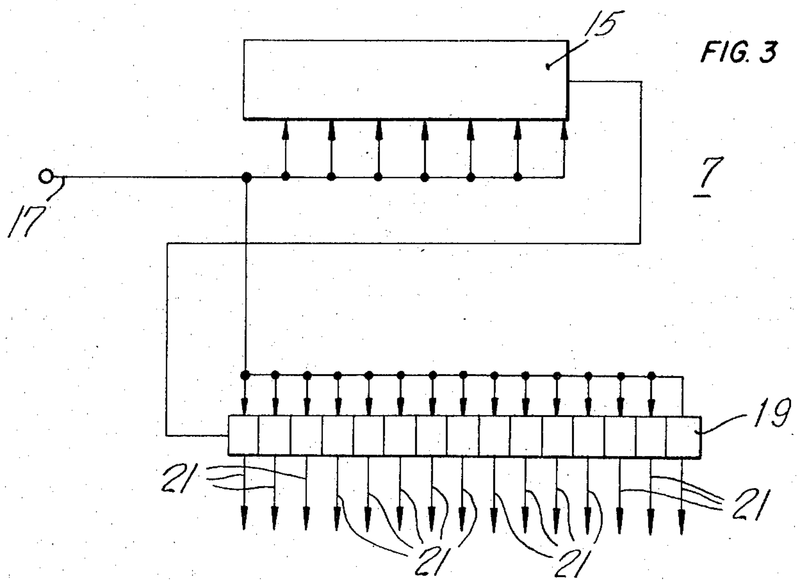
FIG. 3 illustrates schematically the connections as between the code word generator means and the long shift register in accordance with the invention.

The preferred construction of the code word module is shown in FIG. 3 where 15 is a maximal length pseudo-random code generator of the type described in, for example, an article by Scholfield entitled Shift Registers at pages 389 et seq. of Electron Technology, October 1960, or in an article by Ward entitled Requisition of Pseudonoise Signals by Sequential Estimation at pages 475 et seq. of IEEE Transactions on Communications Technology, Vol. COM-13, No. 4, December 1965.

Clock pulses are provided to the generator 15 from the terminal 17 which also provides clock pulses to the long shift register 19. The shift register 19 contains $m$ stages where $m \geq$ the number of subscriber terminals. Each stage of the register 19 contains output lead 21, and the leads 21 correspond to leads 11 of FIG. 1. Each output lead feeds a different subscriber terminal as shown in FIG.2. The register 15 is an $n$ stage register wherein $n$ is such a value that $2^n - 1 \geq m$.

Figure 4:
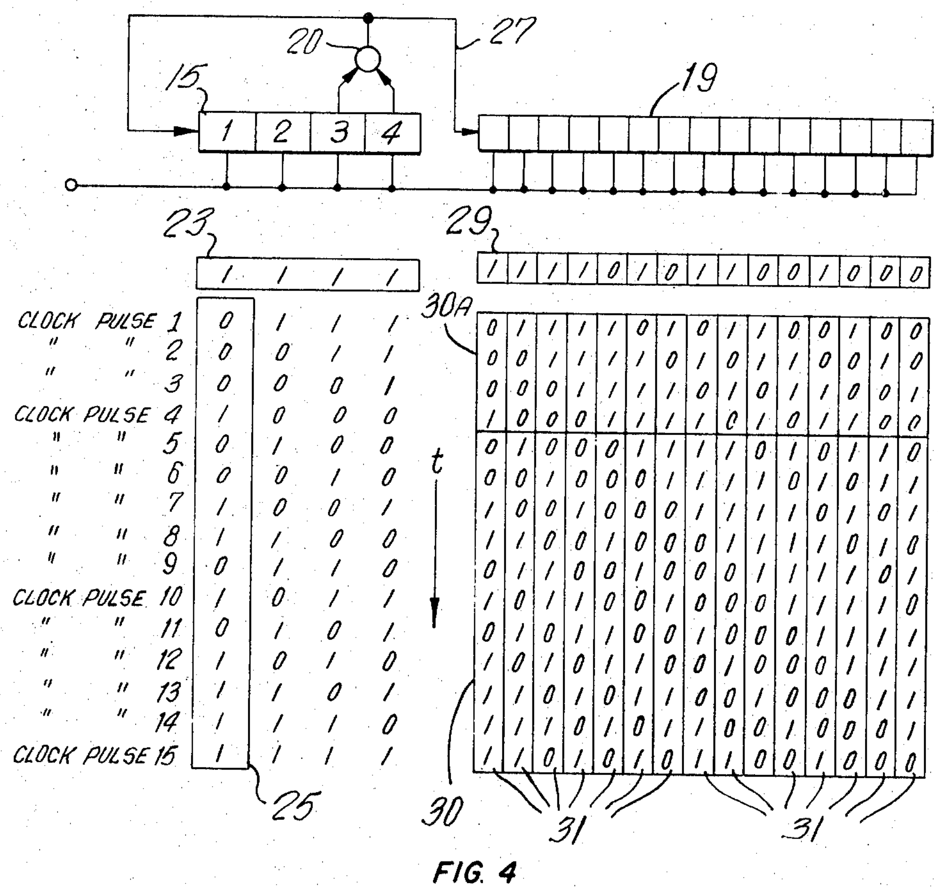
FIG. 4 is provided for explanatory purposes in showing how the unique codes are generated.

FIG. 4 illustrates how the arrangement of FIG. 3 will provide a different unique code at each of its output terminals. In the register 15 of FIG. 4, $n = 4$ and, in the register 19, $m = 15$. The outputs of stages 3 and 4 of the register 15 are connected to module two adder (exclusive-OR gate) 20 whose output is connected to the inputs of the first stages of both the registers 15 and 19. Box 23 shows the initial state of the stages of the register 15 selected for this explanation. Box 25 shows the input to the first stages of the register due to clock pulse $i$ ($i = 1$ to 15), and the four numbers horizontally adjacent the clock pulse i show the state of each stage of the register 15 after the clock pulse.

In a like manner, the vertical columns 31 in box 30 show the states under the corresponding stages of long shift register 19. The states of the stages of the register 19 shown in the horizontal box 29 comprises what will hereinafter be referred to as the "initialized" condition of the long shift register. This condition is achieved by first setting the register 15 to some arbitrary initial condition (e.g., in this case all ones) and then clocking both registers 15 and 19 through a complete cycle of the register 15. ($2^n - 1$ clock pulses).

As can be seen, each vertical column 31 is a replica of the column 25 plus a time delay. Thus, the extreme left hand column 31 has a time delay, relative to column 25, equal to zero, whereas the next column 31 to the right has a time delay, relative to column 25, of one unit. Each subsequent right hand column increases the delay by one unit. Because of the unique dalay at each stage of the long shift register, a unique code is produced at each output of this register.

Figure 5:
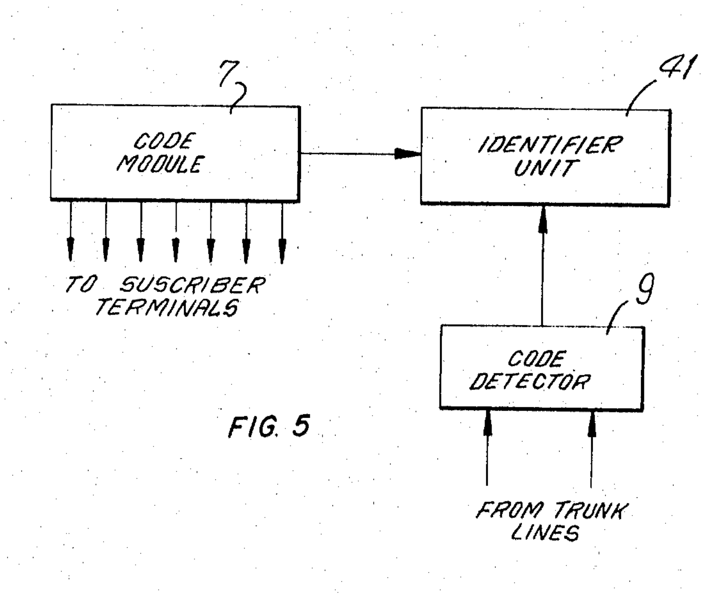
FIG. 5 illustrates, in block diagram form, one system for detecting the identifying code words at the trunk line.

In order to identify the terminal associated with any code word, it is merely necessary to measure the delay of the code word relative to a reference word, e.g., the word appearing in vertical column 25. This can be done using cross-correlation techniques well known in the art with a system as illustrated in FIG. 5. In FIG. 5, the reference word is supplied from the code module 7, which feeds one input to cross-correlator 41. The other input to the correlator is supplied from the output of the detector 9.

It can also be seen from FIG. 4 that unique code words n bits long could be produced at the outputs of the long shift register 19. The $n$ bit words are contained in box 30A. Thus, another method for identifying the channels is to examine that part of the code word associated with the terminal and coinciding with the word 0001 of the register 15. In such a case, the box 41 of FIG. 5 would comprise a look-up table to ascertain the identity of the terminal associated with a detected code word.

It is noted that, in order to produce unique code words at the outputs of register 19, each word must be at least $n$ bits long.

In a third approach, the system can be made asynchronous by providing START and STOP pulses at the beginning and the end of each code word. The detector would then read the code word after it has identified the START signal, and reading of the code word would be terminated at the beginning of the STOP signal. A system for providing such START and STOP pulses at the beginning and end respectively of each code word is illustrated in FIG. 6.

Figure 6:
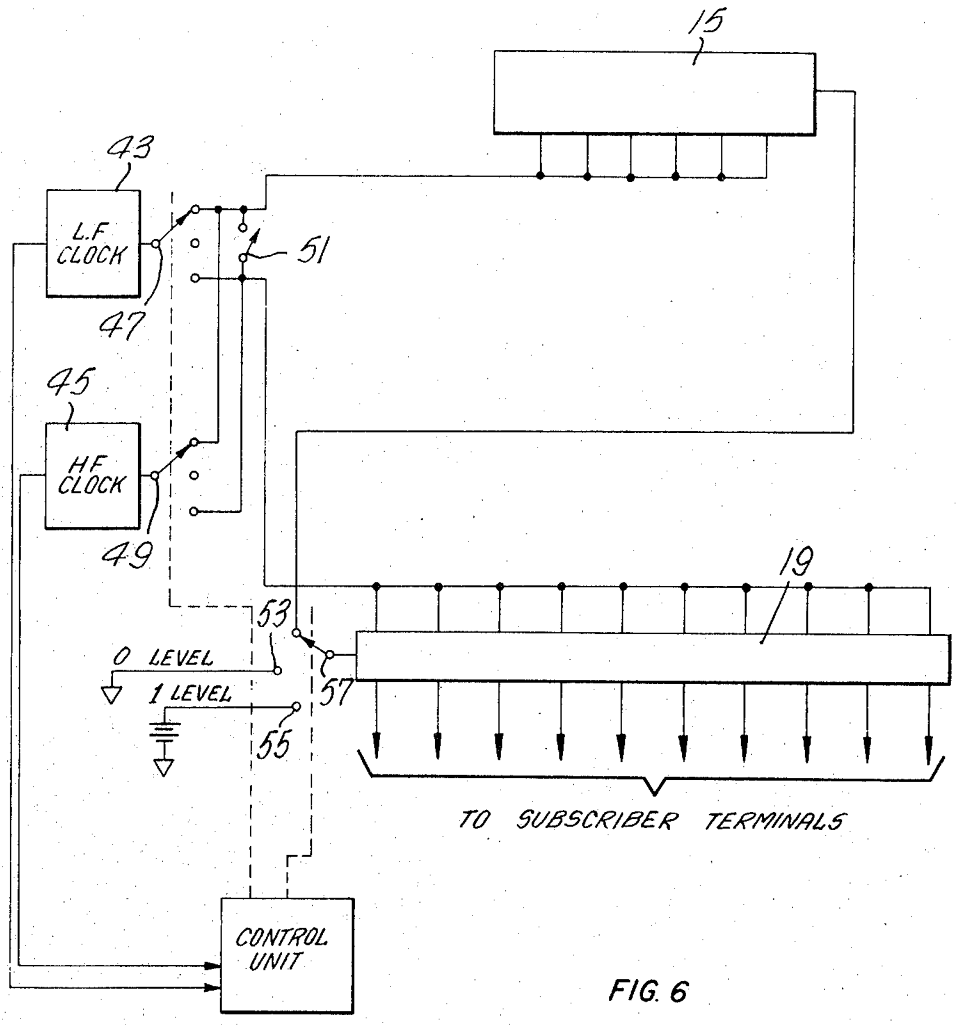
FIG. 6 illustrates, in schematic form, a system for producing START and STOP pulses at the beginning and end, respectively, of identifying code words.

The FIG. 6 system consists of, in addition to the code word generator 15 and the long shift register 19, a low frequency (code word clocking rate) clock 43, a high frequency (initializing rate) clock 45, a zero level terminal 53, a ones level terminal 55 and a control unit 61. The above units are interconnected by switches and wires as follows:

Switch 47 connects the LF clock to either the clock input of 15 or 19 or neither (on the middle terminal). When switch 51 is closed, then any signal applied to one clock input will also be applied to the other. Switch 49 performs the same function for the HF clock as 47 performs for the LF clock. Thus, it is possible to have either the HF or LF clock applied to either or both of the clock input terminals.

Switch 57 connects the input of the long shift register to the output of either the code word generator, the zero level terminal or the one level terminal. The switches are under the control of the control unit which receives feedback signals from both clocks. Although mechanical linkages between control unit and switches is shown in FIG. 6, it is understood that, in preferred embodiments, electronic switching means would be used, and the control unit would control the switching means by electrical links.

To illustrate how the system of FIG. 6 would work, we will use the example of a START signal comprising a zero of duration equal to the time of one bit of the code word bits. The STOP pulse is a one of two bit length.

At the start of operation, switch 57 connects the input of the long shift register to the zero level terminal, and the HF clock is connected to the clock input of the long shift register only. The long shift register is filled with zeros at the high clock rate and, after enough zeros have been provided, a feedback signal is provided to the control unit which then connects the LF clock to the clock input terminal of the long shift register only. A zero is then applied to each subscriber terminal for a one bit period.

It is assumed here that the code word generator is in the all ones, or some other initial state. After the zero bit is applied to the subscriber terminals, the input of the long shift register is connected to the output of the code word generator and the HF clock is applied to the clock inputs of both registers. The long shift register is then initialized by applying $2^n - 1$ clock pulses to both registers after which the LF clock is connected to the clock terminals of both registers. n clock pulses are then supplied to the registers to thereby produce unique code words at the subscriber terminals as above described.

At the end of each code word, a STOP signal is applied to each subscriber terminal. In order to effect this, the HF clock is connected to the clock terminal of the long shift register, and the input of the long shift register is connected to the one level terminal; and the long shift register is filled with ones. At this time, a feedback signal is provided to the control unit which then connects the LF clock to the clock terminal of the long shift register. Two ones are then applied to the subscriber terminals at the LF clock rate. The entire operation is then repeated starting with the START signal, and this operation is repeated every time a code word is produced.

As will be appreciated, while the register 19 is being initialized, and while it is being filled with ones and zeros, noise will be appearing at the output terminals thereof. The length of time the noise exists will be a function of both the stage of the register being considered, as well as the frequency of the HF clock. It has been found that the noise will not interfere with system operations if its duration is made small relative to the pulse width of a pulse of the LF clock. In a preferred embodiment, this is accomplished by providing a relatively high frequency at the HF clock. Thus, if the HF frequency is such that $F_{HF} = 20(2^n - 1)F_{LF}$, then the noise will occupy no more than 10 percent of an LF pulse duration.

The above relates to only one way of providing START and STOP pulses, and many other systems could be used for this purpose without departing from the spirit and scope of the invention.

Figure 7:
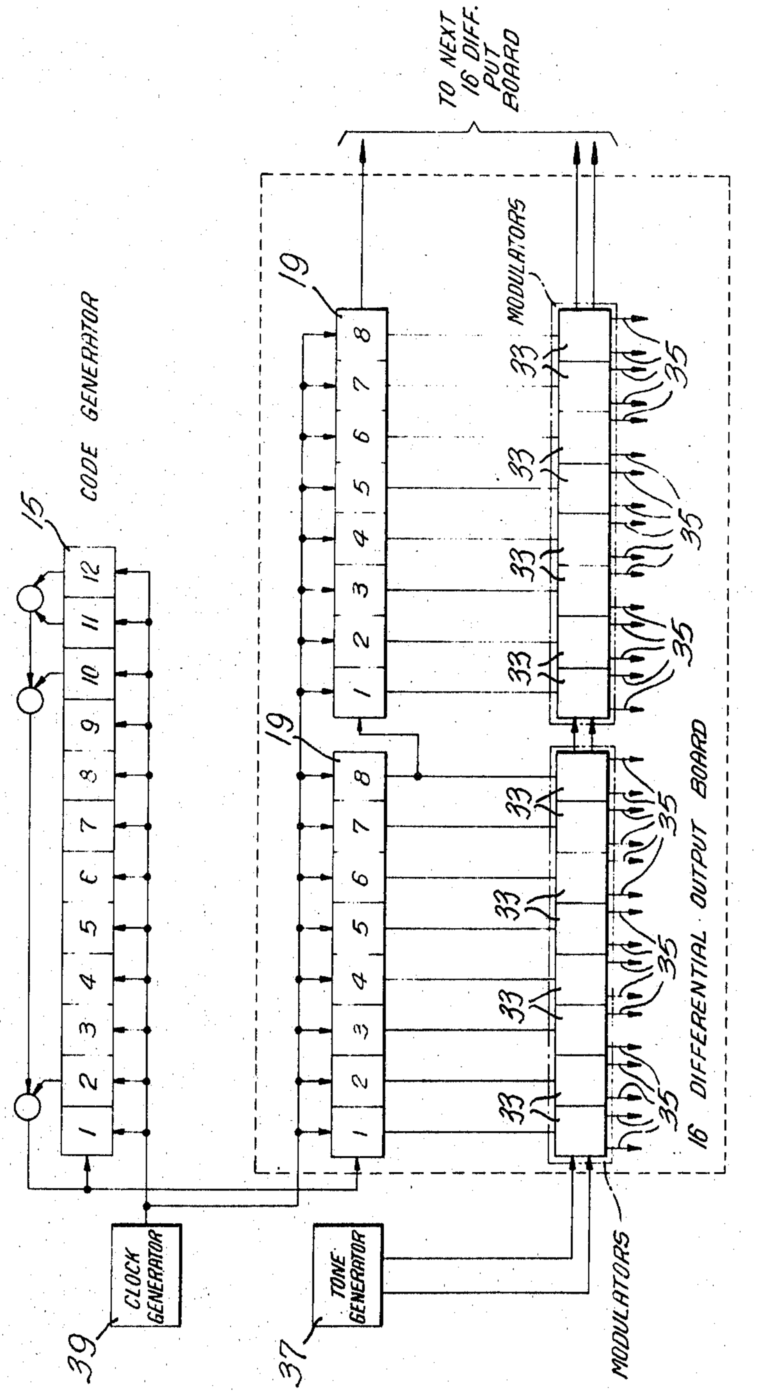
FIG. 7 illustrates a system wherein modulators are provided at the output of the code word module.

Up till now in the description, it has been tacitly assumed that the pulses are applied to the subscriber terminals without modulation. In many cases, this will, in fact, constitute the practical configuration. However, it is possible that it may be necessary of desirable for the pulses to modulate a carrier which is then applied to the subscriber terminals. A system for providing a code word modulated carrier is illustrated in FIG. 7. In this figure, the code generator 15 is a twelve stage register. The long shift register 19 consists of a plurality of serially connected eight stage shift registers. Only two are shown in FIG. 5, but the code word generator in FIG. 5 can accommodate in excess of fifty such eight stage registers.

The clock generator 39 clocks the code word generator and the long shift register at, for example, 5 Hz. The outputs of the long shift registers are connected to modulators 33 at one terminal thereof. A second set of terminals of the modulators are connected to tone generator 37. The tone generator provides two frequencies $f_1$ and $f_2$. The "carrier" frequency is chosen to be outside the voice band, for example 5 KHz, and $f_1$ and $f_2$ are tones centered on 5 KHz and separated by, for example, 50 Hz. The sequence at the output of each stage of the long shift register is used to key the two tones, i.e., a one will key $f_1$ and a 0 will key $f_2$, so that the code word at the output of each stage of the long shift register is frequency modulated onto the carrier.

It will of course be understood that other modulation schemes could be used and that the system above described merely constitutes one feasible arrangement.

Although several embodiments have been described, this was for the purpose of illustrating, but not limiting, the invention. Various modifications, which will come readily to the mind of one skilled in the art, are within the scope of the invention as defined in the appended claims.

I claim:

1. Apparatus for injecting a different unique identifying code word on each of a plurality of telephone subscriber terminals of a private branch exchange telephone system, having a smaller plurality of outside trunk lines, said apparatus comprising:

a code module having a plurality of outputs;

said plurality of outputs being at least equal to said plurality of telephone subscriber terminals;

each one of said plurality of outputs being connected to a different one of said plurality of telephone subscriber terminals; and means in said code module for generating a different unique identifying code at each one of said plurality of outputs, whereby a different unique identifying code is applied to each one of said plurality of subscriber terminals.

2. Apparatus as defined in claim 1 wherein means for generating said identifying code comprises a maximal length pseudo-random code generator.

3. Apparatus as defined in claim 2 and further comprising a long shift register having a plurality of stages, each of said plurality of stages comprising an output means;

said plurality of outputs of said long shift register comprising said plurality of outputs of said code module;

and wherein said means for generating said identifying code includes an output means and said long shift register includes an input means;

said output means of said means for generating said identifying code being connected to said input means of said long shift register.

4. Apparatus as defined in claim 3 and further comprising a separate modulator means between each output of said code module and its associated subscriber terminal.

5. Apparatus as defined in claim 2 wherein said code module produces a unique identifying code word at each one of said code module outputs, and further comprising means for inserting a START signal at the beginning of each identifying code word, and further means for inserting a STOP signal at the end of each identifying code word.

6. Apparatus as defined in claim 2 and further comprising code detecting means on each trunk line for detecting said identifying code.

7. Apparatus as defined in claim 6 wherein said code detecting means comprises cross correlation means, an output of said code module being fed to said cross correlation means as a reference signal.

8. Apparatus as defined in claim 5 and further comprising code detecting means on each trunk line, said code detecting means comprising means for identifying said START and STOP signals to thereby identify the location of an identifying code word.

* * * * *